United States Patent Office 3,218,262
Patented Nov. 16, 1965

3,218,262
GLASS COMPOSITIONS
Stephane Dufaure de Lajarte, Paris, France, assignor to Compagnie de Saint-Gobain, Neuilly-sur-Seine, France
No Drawing. Filed Apr. 17, 1962, Ser. No. 188,256
13 Claims. (Cl. 252—301.1)

This application is a continuation-in-part of application Serial No. 661,005, filed May 23, 1957, now abandoned.

This invention relates to glass manufacture and to silico-aluminous glasses containing no appreciable quantities of alkali metal oxides ($Na_2O$, $K_2O$, $Li_2O$) or of boric anhydride ($B_2O_3$).

Glasses of this type are known to possess high viscosity at high temperature and it is very difficult in making them to vitrify all the silica, the excess of which tends to separate out and to gather on the surface of the melted glass. Therefore, up to the present the manufacture of such glasses has not been accomplished except slowly and at very high temperature with the risk of incomplete fusion.

It is an object of this invention to make silico-aluminous glasses which do not have this imperfection and which may be easily vitrified under conditions analogous to those used in making silica-alkali-lime glasses, that is to say, at a temperature not over 1500° C., and which may be worked as by forming into articles under analogous conditions.

Another object of the invention is to prepare silico-aluminous glasses which have high chemical resistance.

Yet another object is to prepare the novel glasses in such manner as to eliminate a tendency to crystallization.

Another object of the invention is to make glass which is substantially insensible to nuclear radiation and which, when exposed to such radiation, does not itself become radioactive.

Another object of the invention is to make a glass adapted for use in nuclear undertakings which is not clouded by prolonged exposure to nuclear radiation. Another object is to make a glass containing radioactive isotopes of accurately established activity. Another object is to make windows for the inspection of nuclear processes and containers for nuclear materials.

The objects of the invention are accomplished, generally speaking, by glasses of the following composition by weight percentages:

| | Percent |
|---|---|
| Silica ($SiO_2$) | 40–50 |
| Alumina ($Al_2O_3$) | 10–25 |
| At least one of lime, magnesia, barita (CaO, MgO, BaO) | 15–35 |

And as vitrifying agents:

| | |
|---|---|
| Titanium oxide ($TiO_2$) | 0–15 |
| Iron oxide ($Fe_2O_3$) | 0–15 |
| Fluorine (F) | 0–5 |

The total of $SiO_2$, $Al_2O_3$, $TiO_2$, and $Fe_2O_3$ should not exceed 80%. In addition, the glasses of radioactive type must contain one or more radioactiveable elements such as chromium, scandium, and zinc.

The new glasses have excellent chemical durability. It is important to respect the limits of composition indicated. For example, if the quantity of silica falls below 40%, chemical durability is much reduced and the glasses have a strong tendency to crystallization.

Contrary to the usual glasses, they do not contain the oxides $Na_2O$ and $K_2O$ which form highly radioactive isotopes under the action of neutron radiation, nor do they contain lithium oxide ($Li_2O$) and boron oxide ($B_2O_3$) which offer a large capturing surface for neutrons. The percentage of alkaline metal oxides in the glasses of the invention is generally not over 0.1%, and their content of $B_2O_3$ is lower or at most 0.1%.

It is contrary to what one would expect that the presence of material proportions of the oxides of calcium, magnesium and barium is favorable to reduction of the tendency to devitrify. From this point of view, it is preferable that the content of lime should not exceed 20% of the total weight of the glass, and it is desirable to have all three of these oxides present, each one in a proportion of at least several percent of the total weight of the glass.

The percentages expressed herein are percentages by weight based on the total weight of the glass unless otherwise specified.

The presence of titanium oxide contributes to lowering the temperature of vitrification and makes it easier. Iron oxide plays a similar role but if present in a quantity greater than several percent, produces glasses which are opaque to visible and to infrared rays but as glass may frequently be without such transparency, iron oxide is frequently useful in addition to or as a substitute for titanium oxide. Fluorine favors vitrification and lowers the temperature of vitrification, and it reduces the tendency to devitrification. It is not necessary to exceed 5% because the loss by volatilization then becomes important.

*Examples 1 to 5*

| | 1 | 2 | 3 | 4 | 5 |
|---|---|---|---|---|---|
| $SiO_2$ | 48 | 46 | 46 | 44 | 45 |
| $TiO_2$ | 5 | 5 | 10 | | 5 |
| $Al_2O_3$ | 22 | 20 | 15 | 20 | 20 |
| $Fe_2O_3$ | | | | 10 | 5 |
| MgO | 6 | 8 | 8 | 8 | 5 |
| CaO | 14 | 16 | 16 | 13 | 11 |
| BaO | 5 | 5 | 5 | 5 | 9 |
| +F | 4 | 4 | 4 | 4 | 4 |

The foregoing glasses were obtained by melting the raw materials indicated in the following table at the temperatures indicated:

| | 1 | 2 | 3 | 4 | 5 |
|---|---|---|---|---|---|
| Crushed Sand | 48 | 46 | 46 | 44 | 45 |
| Hydrated Alumina | 33.7 | 30.6 | 23 | 30.6 | 30.6 |
| Titanium Oxide | 5 | 5 | 10 | | 5.0 |
| Fluorspar | 8.2 | 8.2 | 8.2 | 8.2 | 8.2 |
| Dolomite | 26.3 | 32.8 | 32.8 | 24.0 | 17.6 |
| Magnesium Carbonate | 1.1 | 2.1 | 2.1 | 5.8 | 2.8 |
| Barium Carbonate | 6.4 | 6.4 | 6.4 | 6.4 | 11.5 |
| Iron Oxide | | | | 10.0 | 5.0 |
| Manufacturing Temperature in ° C. | 1,470 | 1,480 | 1,470 | 1,470 | 1,470 |

The characteristics of the glass in the first table were as follows:

| | 1 | 2 | 3 | 4 | 5 |
|---|---|---|---|---|---|
| Density | 2.78 | 2.79 | 2.87 | 3.10 | 3.02 |
| Chemical attackability (method DGG), mg | 4 | 4 | 3 | 4 | 3 |
| Logarithm of Viscosity at 1,200° C | 2.98 | 2.70 | 2.33 | 2.65 | 2.54 |
| Logarithm of Viscosity at 1,300° C | 2.25 | 2.10 | 2.00 | 2.20 | 2.05 |

The chemical attackability is determined by the standard method of the Deutsche Glastechnische Gesellschaft (method DGG). According to that method 4 cc. of glass powder passing between screens 45 and 50 are heated for 5 hours at 102° C. in the presence of water, of which the volume is kept constant at 100 cc. The aqueous solution is filtered off and evaporated to dryness, and the residue of the evaporation is dried at 150° C. and weighed. The residue is expressed in milligrams per 100 cc. of water.

By way of comparison, the residue of bottle glass is on the order of 25 mg., and that of window glass on the order of 30 to 40 mg.

An important property of the glasses employing the invention is their insensibility to nuclear radiation. In effect, contrary to usual practice, they do not contain the oxides $Na_2O$, $K_2O$, $Li_2O$, or $B_2O_3$, of which the first two form radioactive isotopes of great activity under the effect of neutron radiation, and the latter two offer an important section for the capture of neutrons.

It results that the glasses conforming to the invention may be applied in atomic industries in all cases where it is necessary to use glass in which radioactive isotopes of substantial activity and length of life are not generated by irradiation by neutrons, and in which there are no elements offering substantial areas of capture of neutrons.

These glasses are particularly adapted to the manufacture of containers for substances which are to be activated by neutrons within nuclear reactors. Such receptacles, of which the opening is left free to permit the action of radiation on the substances to be activated, must be made of transparent material whenever it is desired to observe the substances irradiated, either during irradiation or afterward, to make it unnecessary to remove the substances from the containers. It is indispensable that such containers should not be altered by the substances that is introduced nor by the nuclear radiation, and that it should not interfere with the operation of the reactor by the presence of elements offering a substantial section of capture of neutrons.

Glasses made by this invention are perfectly adapted to this usage. Furthermore, when the container and its content have been removed from the nuclear reactor, the container does not emit any radiation. The thickness of the walls of the container may be established with the object of absorbing part of the radiation and of transforming hard gamma rays emitted by the contained substance into softer and less dangerous gamma rays. The use of the novel containers made from the glasses of this invention materially improves the manipulation and the observation of irradiated substances.

It is possible to put into these new glasses, in the proportions in which they have been used in other glasses, contents such as cerium oxide in order to prevent the clouding of these glasses under the effect of prolonged bombardment by neutrons, thus aiding the containers to maintain their transparency.

The glasses of this invention make is possible to produce superior windows for the observation of nuclear phenomena. Their high density varies generally between 2.6 and 3.0, which may be increased by increasing the content of BaO, and accomplishes the absorption of radiation with lesser thicknesses than ordinary glasses. The absence in the new glasses of radioactivable elements permits one to dismount and to manipulate windows without being exposed to irradiation by radoactive isotopes formed in the glasses.

The advantages of the invention are numerous and have been expounded as the description has proceeded. No effort has been made to explain herein every use to which the new glasses may be put, but all uses are included within the protection of the claims.

The new glasses have many unique and distinctive properties, and the process by which they are made proceeds under ordinary conditions of temperature, etc. By varying the content and percentage of different ingredients, one can modify the properties of the glasses to constitute new glasses having different properties which are variable at will by methods comprehensible to the ordinary glass technician.

Another invention is derived from that which has been described hereinabove, namely, the preparation of glasses containing radioactive isotopes of activity exactly defined and established. In this invention one utilizes the glasses hereinabove defined, but one adds to the mixture of raw materials from which they are made one or more radioactivable elements. This may be done with such exactness as to precisely establish the degree of activation which may later be imparted. After the glass has been made with its content of radioactivable elements, it may be worked, shaped into objects, broken into granules, or otherwise treated, and may then be subjected to the action of neutrons in the interior of a pile or of a nuclear reactor. This irradiation presents no difficulty because the glass is exempt of elements which offer a substantial section of capture of neutrons.

Furthermore, the glasses and the objects made from them do not contain other radioactive elements than those which have been specially introduced in selected proportions, and because of this the product contains, after irradiation, an amount of radioactive isotopes of activity and duration of life exactly defined.

To obtain the same results from the miscellaneous glasses of the prior art, which are susceptible, because of their fundamental composition, of forming radioactive isotopes under the effect of radiation of neutrons, or offering a substantial section for the capture of neutrons, one must not submit them to the action of neutrons and it is necessary to introduce the radioactive isotopes themselves into the vitrifiable mixture, so that the fusion and the subsequent operations carried out on the glasses require the use of security measures and means of great importance. According to the present invention, the radioactivable elements may be introduced into the vitrifiable mixture in any of their forms (as oxides of the element, as carbonates, etc.) and thus require no other treatment preparatory to fusion than such ingredients are accorded in the manufacture of prior art glasses. They are incorporated in the glasses in a homogeneous way, well vitrified and well dispersed.

A glass according to the present invention can be obtained by adding one or more elements which can be made radioactive to the mixture of vitrifiable materials and after completing the manufacturing operations such as working, shaping, grinding, etc. . . . the glass or glass article obtained is exposed to neutron radiation inside an atomic pile or nuclear reactor.

The irradiation does not present any difficulty, since the basic constituents of the glass are free from elements offering a large neutron capturing surface.

On the other hand, the glass, or the glass objects made therefrom, do not contain any radioactive elements other tha those which have been introduced specifically in a definite proportion. Therefore, the product obtained contains a quantity of radioactive isotope with an accurately defined activity and effective life.

To obtain the same result with glasses which, due to their basic composition, form radioactive isotopes under the action of neutron radiations, or offer a considerable neutron capturing surface, it would be necessary to refrain from subjecting them to the action of neutrons, and the radoactive isotopes themselves would have to be introduced into the vitrifiable mixture. Fusing the mixture and any subsequent operations carried out on the glass obtained would then require the provision of considerable safety devices to protect the operating personnel.

The elements which can be made radioactive may be introduced into the vitrifiable mixture in any suitable form, for example as oxides or carbonates, provided that when the fusion is completed, they are incorporated homogeneously in the glass in a vitrified or dispersed state.

The elements which can be activated and which are capable of forming isotopes with very strong radioactivity, such as for example, chromium and scandium, will generally be introduced in a quantity which is small in proportion to the vitrifiable mixtures, and will not modify the vitrifying conditions of the selected glass.

Certain elements, because of a weaker activity, will be introduced in a larger proportion of the order of several percent. Zinc belongs to this class and also offers the advantage of constituting in the oxide form a compound which is particularly favorable to the vitrification of glasses according to the invention.

For example, the proportions of the radio-activable elements in the glasses of the invention may vary from a few hundredths percent to several percents, in particular up to 10%.

The following Examples 6 to 9 show compositions of glasses falling within this invention which contain zinc oxide:

|  | 6 | 7 | 8 | 9 |
|---|---|---|---|---|
| $SiO_2$ | 44 | 44 | 45 | 44 |
| $Al_2O_3$ | 20 | 19 | 20 | 19 |
| $Fe_2O_3$ | 13 | 2 | ----- | 5 |
| MgO | 7 | 5 | 5 | 5 |
| CaO | 13 | 13 | 13 | 13 |
| BaO | ----- | 10 | 10 | 8 |
| ZnO | 3 | 7 | 7 | 6 |
| +F | 4 | 4 | 4 | 4 |

These glasses may be obtained from vitrifiable mixtures as follows:

|  | 6 | 7 | 8 | 9 |
|---|---|---|---|---|
| Crushed Sand | 41.2 | 44 | 45 | 44 |
| Hydrated Alumina | 29.7 | 29 | 30.6 | 29 |
| Iron Oxide | 13.0 | 2 | ----- | 5 |
| Fluorspar | 8.2 | 8.2 | 8.2 | 8.2 |
| Dolomite | 23.5 | 23.5 | 23.5 | 23.5 |
| Talc | 6.0 | ----- | ----- | ----- |
| Barium Carbonate | ----- | 12.9 | 12.9 | 10.3 |
| Zinc Oxide | 3.0 | 7.0 | 7.0 | 6.0 |

They have the following properties:

|  | 6 | 7 | 8 | 9 |
|---|---|---|---|---|
| Density | 2.85 | 2.89 | 2.89 | 2.91 |
| Chemical Attackability (Method DGG), mg. | 4 | 3 | 4 | 4 |
| Logarithm of Viscosity at 1,200° C | 3.10 | 2.90 | 3.03 | 2.90 |
| Logarithm of Viscosity at 1,300° C | 2.30 | 2.04 | 2.17 | 2.06 |

These glasses, after manufacture, are placed within range of a bombardment by neutrons whereby the elements capable of forming radioactive isotopes become radioactive. A positive limit to their radioactivity has been set by the composition of the glasses themselves.

These glasses have valuable and unique uses. For example, such glasses after they have undergone the preliminary steps of fusion, cooling and crushing to convenient grain size, are radioactivated and may be used to determine the movement of sandbanks of rivers and oceans. Thereafter, any shifting of the banks can be determined by any appropriate radiation-responsive instruments.

The chemical stability of the glasses makes them particularly suitable for use in observations which take place over very long periods of time.

A great advantage of this invention is that radioactive isotopes, which are particularly dangerous because of the capacity of the human organism to absorb their rays by accidental exposure, may be used in a much less dangerous way when they are incorporated in a vitreous product by the methods of this invention.

As many apparently widely different embodiments of the present invention may be made without departing from the spirit and scope thereof, it is to be understood that the invention is not limited to the specific embodiments.

I claim:
1. Glass adapted to measured activation by radiation which consists in its essential ingredients of

|  | Percent |
|---|---|
| Silica | 40–50 |
| Alumina | 10–25 |
| At least one of the oxides of Ca, Ba, and Mg of which CaO is not over 20% of the total weight of the glass and of which each is preferably present in several percent | 15–35 | and which also contains a predetermined proportion of a radioactivable ingredient whereby the glass has an accurately limited radioactivability.

2. A glass according to claim 1, said radioactivable ingredient being at least one of the group consisting of Cr, Sc, and Zn, dispersed in the glass in a vitrified state.

3. A glass according to claim 1 in which said radioactivable ingredient is about 3–7% ZnO, dispersed in the glass in a vitrified state.

4. Glass which consists in its essential elements of

|  | Percent by weight |
|---|---|
| Silica | 40–50 |
| Alumina | 10–25 |
| Oxides of Ca, Ba, and Mg (of which CaO is not over 20% of the total weight of the glass) of which each is present in several percent | 15–35 | which is essentially free of the oxides $Na_2O$, $K_2O$, $Li_2O$, and $B_2O_3$, and which also contains a predetermined proportion of a radioactivable ingredient whereby the glass has an accurately limited radioactivability.

5. A method of making radioactivable glass of precisely limited radioactivity which comprises vitrifying raw materials, consisting of

| Sand | about 41 to about 44%. |
|---|---|
| Alumina | about 29 to about 31%. |
| Iron oxide | about 0 to about 13%. |
| Fluorspar | about 8 to about 9%. |
| Dolomite | about 23 to about 24%. |
| Talc | about 0 to about 6%. |
| Barium carbonate | about 0 to about 13%. |
| Zinc oxide | about 3 to about 6%. | at a temperature on the order of 1400 to 1500° C., cooling and shaping the glass, and bombarding it with high energy neutron radiation.

6. The glass of claim 1 irradiated by neutrons.

7. The glass of claim 1, said glass containing not more than 0.1% of alkaline metal oxides and not more than 0.1% of $B_2O_3$.

8. The glass of claim 1, said glass containing as additional ingredients, a vitrifying agent selected from the group consisting of $TiO_2$, $Fe_2O_3$ and a fluorine-containing vitreous ingredient of glassmaking grade.

9. The glass of claim 8, the $TiO_2$ content being not more than 15%, the total of $Al_2O_3$, $SiO_2$, and $Fe_2O_3$ being not more than 80%.

10. The glass of claim 8, said glass having not more than 15% $Fe_2O_3$, the total of $Al_2O_3$, $SiO_2$ and $Fe_2O_3$ being not more than 80%.

11. The glass of claim 9, said glass having not more than 15% $Fe_2O_3$, the total of $Al_2O_3$, $SiO_2$, $TiO_2$ and $Fe_2O_3$ being not more than 80%.

12. Vitrified glass having the composition by weight, silica 40–50%, alumina 10–25%, oxides of Ca, Ba and Mg having a total of 15–35%, the CaO content being not more than 20% of the total weight of the glass, said glass containing not more than 0.1% alkali metal oxide and not more than 0.1% $B_2O_3$, and containing a predetermined proportion of a radioactive ingredient whereby the glass has an accurately limited radioactivability.

13. The glass of claim 12, said glass containing a vitrifying agent selected from the group consisting of Ti, Fe and F.

(References on following page)

References Cited by the Examiner

UNITED STATES PATENTS

| | | | |
|---|---|---|---|
| 2,952,641 | 9/1960 | McKenzie | 252—301.1 |
| 2,955,088 | 10/1960 | Beerbower | 252—301.1 |
| 2,988,523 | 6/1961 | Erskine | 252—478 |
| 3,007,882 | 11/1961 | Lach | 252—478 |
| 3,084,054 | 4/1963 | Tiede | 106—52 |
| 3,095,311 | 6/1963 | Von Wranau et al. | 102—52 X |

OTHER REFERENCES

The Condensed Chemical Dictionary, 5th edition (1956), page 357 (QD5 C5).

REUBEN EPSTEIN, *Primary Examiner.*

OSCAR R. VERTIZ, CARL D. QUARFORTH,
*Examiners.*